G. DALÉN.
VALVE.
APPLICATION FILED MAY 23, 1908.
954,172.
Patented Apr. 5, 1910.
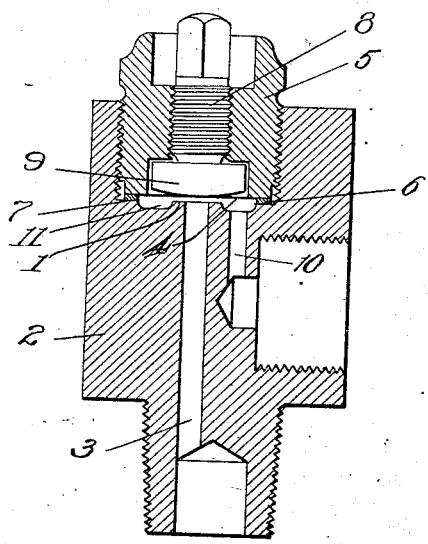

UNITED STATES PATENT OFFICE.

GUSTAF DALÉN, OF STOCKHOLM, SWEDEN, ASSIGNOR, BY MESNE ASSIGNMENTS, TO AMERICAN GASACCUMULATOR COMPANY, A CORPORATION OF NEW JERSEY.

VALVE.

954,172.   Specification of Letters Patent.   Patented Apr. 5, 1910.

Application filed May 23, 1908. Serial No. 434,656.

*To all whom it may concern:*

Be it known that I, GUSTAF DALÉN, engineer, subject of Sweden, residing at Kungstensgatan 62, Stockholm, Sweden, have invented new and useful Improvements in Valves, of which the following is a specification.

The present invention refers to a valve, in which leakage around the valve spindle is prevented without using a packing box for this purpose, such packing boxes, as commonly known, being unreliable in their function and requiring repeated adjustments. For this purpose the valve consists of a flexible membrane, which is arranged above a valve seat and is pressed against said seat for closing the valve by screwing down a screw spindle, abutting against the membrane. For opening the valve said screw spindle is screwed back, whereby the membrane retakes its original position owing to its flexibility and owing to the pressure of the fluid flowing through the valve. Said fluid flows through the valve casing only on one side of the membrane, which is tightly pressed between tightening surfaces of the valve casing and a screw plug.

For making the invention fully understood reference is made to the drawing, showing a valve of this kind in longitudinal section.

1 indicates the valve seat of the valve casing 2, and 3 indicates a boring, opening in valve seat and serving as inlet for the fluid in question. Above said valve seat 1 a flexible membrane 4 is tightly pressed between an annular surface 6 of the valve casing and the end surface of a screw plug 5, whereby a tightening ring 7 may be inserted between said surface 6 and the membrane if necessary. A screw spindle 8 is screwed through a threaded central hole of the screw plug 5 and abuts against a block 9, which in turn abuts against the central portion of the membrane 4. Or the lower end of the screw spindle 8 may abut directly against said membrane, whereby the block 4 is omitted.

10 indicates the outlet, opening in an annular space 11, arranged concentrically to the valve seat 1.

The drawing illustrates the open position of the valve, whereby the fluid is flowing through the inlet 3, the valve seat 1, and the annular space 11 to the outlet 10. The space 11 is tightly shut off from the threadings of the screw plug 5 and of the screw spindle 8 owing to the tightening at 6, 7, so that leakage through said threadings is prevented. For closing the valve, the screw spindle 8 is screwed down, whereby the membrane 4 is pressed against the seat 1.

What I claim is:—

In combination with a valve casing having a valve seat and an inlet delivering therethrough, said casing having an annular space arranged around said seat and an outlet communicating with said space, said casing having an annular membrane support surrounding said space, a tightening ring on said support, a membrane disposed on said ring and supported thereby above and out of contact with said seat, a screw plug having threaded engagement with said casing and provided with an annular shoulder engaging said membrane and holding the same in engagement with said ring, and a member engaging said membrane to force the same upon said seat to close the valve, said member having a membrane engaging surface substantially equal to the diameter of its inlet, the remaining surface receding upwardly and laterally therefrom, substantially as and for the purpose set forth.

In testimony whereof I affix my signature in presence of two witnesses.

GUSTAF DALÉN.

Witnesses:
 WALDEMAR BOMAN,
 HJALMAR PETEERSTROM.